United States Patent [19]

Douglas

[11] Patent Number: 4,952,135

[45] Date of Patent: Aug. 28, 1990

[54] APPARATUS FOR REDUCTION OF MOLD CYCLE TIME

[75] Inventor: Paul I. Douglas, The Woodlands, Tex.

[73] Assignee: Shell Oil Company, Houston, Tex.

[21] Appl. No.: 366,712

[22] Filed: Jun. 15, 1989

Related U.S. Application Data

[62] Division of Ser. No. 197,738, May 23, 1988, Pat. No. 4,880,583.

[51] Int. Cl.$^5$ .................. B29C 33/42; B29C 45/30
[52] U.S. Cl. .................. 425/543; 425/555; 425/557; 249/65; 249/82; 249/107; 264/230; 264/313; 264/321; 264/257
[58] Field of Search ........... 264/314, 257, 258, 230, 264/313, 315, 316, 130, 321, 241, 279, 279.1, 328.7, 328.8, 328.12; 249/65, 82, 117, 134, 107; 425/116, 120, 557, 427, 543, 405.1, 417, 542, 555, 117, 128, 129.1, 425

[56] References Cited

U.S. PATENT DOCUMENTS

| | | | |
|---|---|---|---|
| 2,460,820 | 2/1949 | Hagopian | 264/314 |
| 2,794,233 | 6/1957 | Morton | 249/65 |
| 2,852,807 | 9/1958 | Altschuler | 249/65 |
| 3,135,640 | 6/1964 | Kepka | 264/257 |
| 3,309,450 | 3/1967 | Rodgers | 264/257 |
| 3,832,745 | 9/1974 | Dorfman | 249/65 |
| 4,116,841 | 9/1978 | Borsangi | 264/257 |
| 4,124,678 | 11/1978 | Stroupe | 264/314 |
| 4,148,597 | 4/1979 | Larsen | 264/314 |
| 4,165,287 | 8/1979 | Goyne | 264/257 |
| 4,238,437 | 12/1980 | Rolston | 264/257 |
| 4,239,625 | 12/1980 | Hlavinka | 264/257 |

*Primary Examiner*—Jay H. Woo
*Assistant Examiner*—Jeremiah F. Durkin, II

[57] ABSTRACT

An apparatus is disclosed for the reduction of mold cycle time. A heat recoverable member in a compressed state is placed within a channel defined relative to the surface of a mold. A hardenable liquid used to form the article then flows in an accelerated manner through the channel. Thermal energy supplied to the heat recoverable material thereafter causes the heat recoverable material to expand within the channel, thereby displacing the hardenable liquid from the channel. The temperature of gelation of the hardenable liquid and the recovery temperature of the heat recoverable material may be selected such that the channels are substantially filled by the heat recoverable material prior to the hardening of the hardenable liquid. In this manner, the heat recoverable material becomes flush with the surface of the mold prior to hardening of the liquid so as to yield an article of manufacture having a relatively planar surface.

9 Claims, 2 Drawing Sheets

FIG. 1
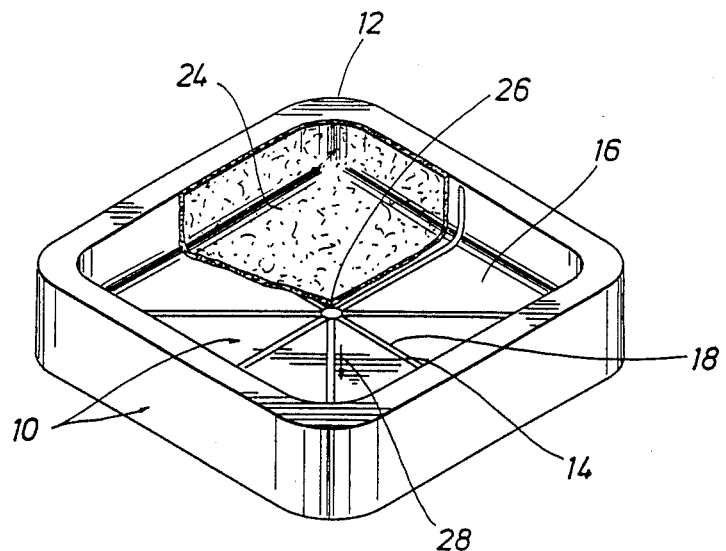
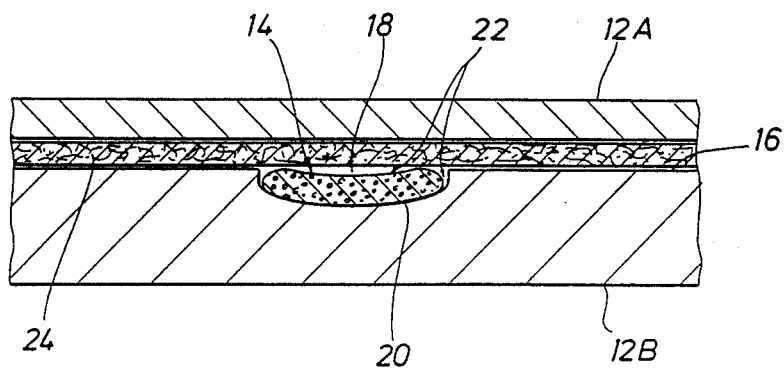
FIG. 2
FIG. 3
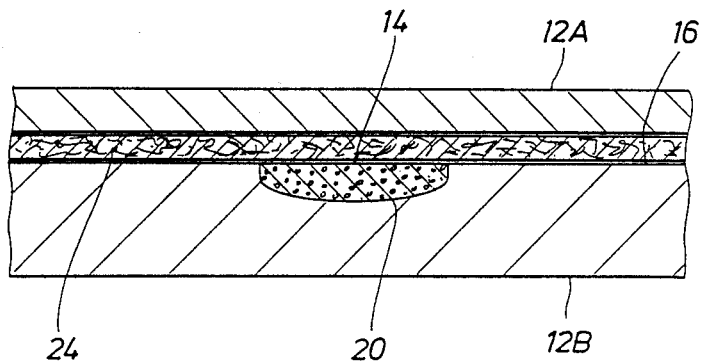

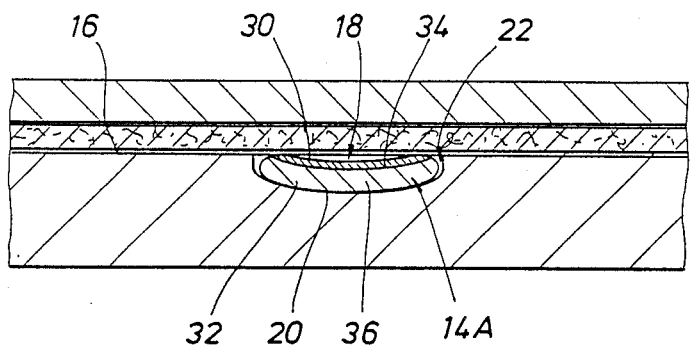
FIG. 4
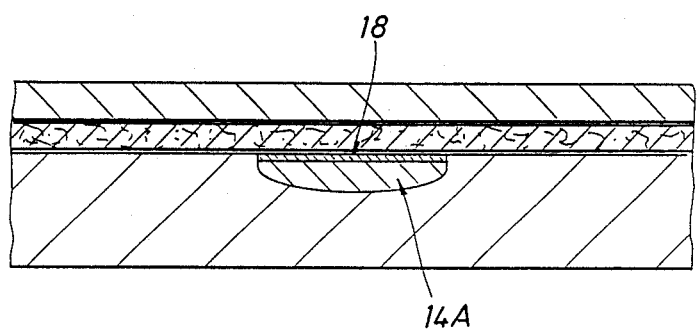
FIG. 5
FIG. 6
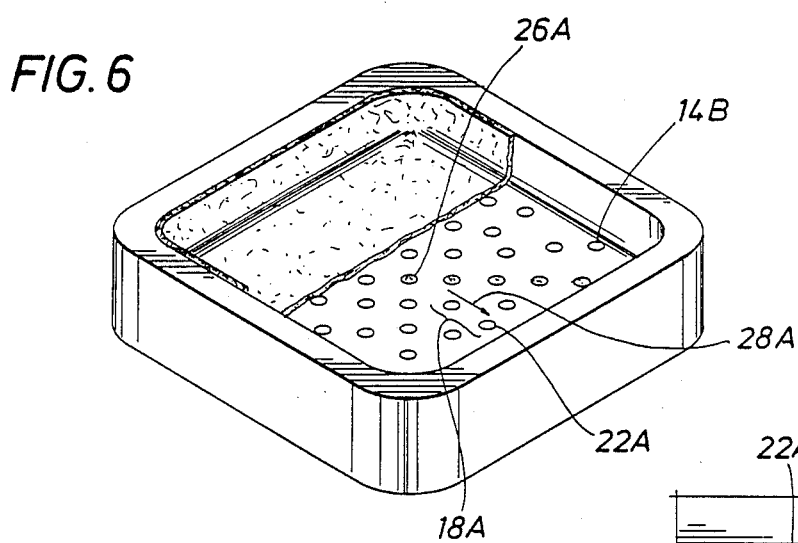
FIG. 7
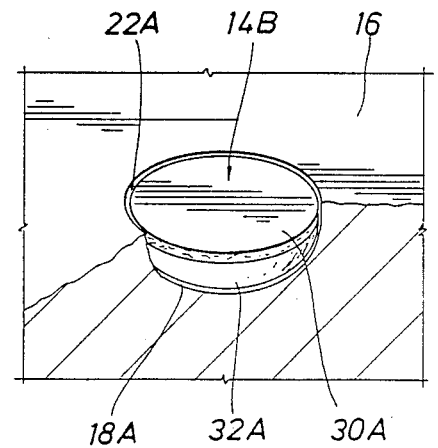

APPARATUS FOR REDUCTION OF MOLD CYCLE TIME

This is a division of application Ser. No. 197,738, filed May 23, 1988, now U.S. Pat. No. 4,880,583.

RELATED APPLICATION

This application is related to U.S. Pat. No. 4,873,044, filing date Dec. 21, 1987, Mr. Joseph N. Epel, inventor issued Oct. 10, 1989, entitled Method for Reduction of Mold Cycle Time.

BACKGROUND OF THE INVENTION

The invention relates to a method and apparatus for use in the molding of articles of manufacture, wherein a hardenable liquid forms a portion of the molded article.

Various molding methods are discussed in Chapters 4 and 5 of the book entitled "*Handbook of Reinforced Plastics*", Society of the Plastics Industry, Inc., copyright 1964, published by the Reinhold Publishing Corporation, Library of Congress Catalog Card No. 64-15205. Whenever contact molding, bag molding, or similar procedures are used to fabricate articles of manufacture formed from fiber reinforced plastic, single die molds will typically be required. Whenever higher pressures are necessary, such as in premix or preform molding, matched die molds will be necessary.

To economically produce these articles using any type of mold, the rate of article production must be maximized to allow quick recovery of the capital cost associated with the purchase of the mold. The mold cycle time must be minimized. In the case of an article that incorporates fibers or filaments within the hardenable liquid, it is desirable to quickly wet these materials. In the case of an article that is comprised entirely of a hardenable liquid, (typically a thermosetting resin), it is desirable to have the liquid quickly flood the mold cavity such that the curing time of the resin may be kept to a minimum.

A method and apparatus therefore need be developed that permits rapid flow of the resin throughout the mold and, when fibers are used to make the article, permits rapid wetting of these fibers.

SUMMARY OF THE INVENTION

In a preferred embodiment of the present invention, channels are defined downwardly within a normally planar mold surface, the channels allowing accelerated flow of the hardenable liquid throughout the mold. A heat recoverable material, (or combination of heat recoverable materials) previously having been deformed under heat and/or pressure from an expanded first configuration to a compressed second figuration is then located within a portion of the channel. The hardenable liquid is then flowed through the mold. The heat recoverable material expands within the channel prior to the hardening of the liquid such that prior to dimensional stabilization of the article of manufacture by hardening of the liquid, the heat recoverable material has substantially filled the entire channel. The heat recoverable member may be coated with a parting agent on its surface common with the molded article, so that the member may easily be removed from the article of manufacture after the article hardens and is removed from the mold.

In one embodiment of the present invention, the channels are defined in an elongated manner radially outward from at least one hardenable liquid injection port and the heat recoverable members are shaped to fit within the elongated channels. To ensure controlled expansion of the members within the elongated channels, openings or interstices are defined in the heat recoverable material as described below.

In another embodiment of the present invention, cylindrical openings are defined in the mold surface and cylindrical heat recoverable members (compressed) are placed within the cylindrical openings. Application of thermal energy sufficient to raise the temperature of the heat recoverable member to a suitable temperature of recovery (as with the elongated heat recoverable member) causes the circular heat recoverable member to expand within the circular opening. Since expansion of the circular member need not be so closely controlled as expansion of the elongated member, interstices need not be defined within the circular heat recoverable member.

When fibers are incorporated within the article, the resin flows faster through the liquid channel than through the fiber packed portions of the mold. By proper placement of the liquid channels beneath the fibers, the path of relatively slow resin flow through the fibers is minimized. The total flow time of the resin throughout the mold is thereby reduced because of the reduction of the distance that the resin has to flow through the flow impeding fibers.

Acceleration of portions of the resin flow throughout the mold reduces the total resin fill time of the mold and allows the use of the resin having a quick curing time and therefore allows the rapid production of a quantity of articles from within the same mold.

It is therefore a feature of the present invention to temporarily define a fluid flow channel adjacent the normal surface of the mold and to maintain that channel until a hardenable liquid such as a thermosetting resin has completely flowed throughout the mold and has thoroughly wetted any glass fibers placed within the mold. Prior to hardening of the resin, the channel disappears by expansion of the heat recoverable material within the channel to an elevation common with the normal surface of the mold.

It is therefore an object of the present invention to describe a method and apparatus for the reduction of mold cycle time.

These and other features and advantages of the present invention will become apparent from the following detailed description wherein reference is made to the Figures in the accompanying drawings.

In the Drawings

FIG. 1 shows a schematic representation of a mold having a mold surface with channels for flow of a hardenable liquid defined therein.

FIG. 2 is a schematic representation in a side view showing the heat recoverable material means positioned within a channel defined downwardly relative to the mold surface. The heat recoverable material means are shown in their compressed configuration.

FIG. 3 is a schematic representation in a side view showing the heat recoverable material means in its expanded configuration substantially filling the channel.

FIG. 4 is a schematic representation in a side view of an alternative embodiment of the heat recoverable material means, shown having a first portion and second portion in a compressed state.

FIG. 5 is a schematic representation in a side view of the heat recoverable material means of FIG. 4 shown in its expanded configuration.

FIG. 6 shows an isometric representation of a mold having a mold surface wherein the channels for flow of a hardenable liquid are defined by a series of circular channel openings defined downwardly within the mold surface.

FIG. 7 is a schematic representation showing the heat recoverable material means positioned within the circular channel opening.

DETAILED DESCRIPTION

Referring now to FIGS. 1, 2 and 3, a molding apparatus 10 is shown. The apparatus 10 comprises a mold 12 and heat recoverable material means 14. The surface 16 of the mold can be seen to have at least one channel 18 with an associated channel surface 20 and channel opening 22 defined relative to the mold surface 16. The channel allows accelerated flow of the hardenable liquid throughout the mold 12, regardless of the point of entrance of the liquid within the mold 12, Heat recoverable material means 14 can be seen in FIG. 2 in a compressed configuration being located within a portion of the channel 18. The heat recoverable material means 14 when heated expands within the channel 18 so as to substantially fill the channel, as shown in FIG. 3, prior to hardening of the liquid. In a preferred embodiment the material means of FIGS. 1-3 comprises a polymeric thermoplastic foam as discussed below.

It would now be advisable to review the background technology related to heat recoverable material means 14, by reference, for example, to Great Britain Patent No. 1,529,351. By heat-recoverable article there is meant a polymeric or metallic article which has been deformed under heat and/or pressure from an original configuration to a second configuration and which solely upon being subjected to a suitable temperature tends to recover to or towards its original configuration.

Polymeric articles may be made capable of being rendered heat-recoverable by, for example, crosslinking with irradiation with beta or gamma rays or by chemical means or by a combination thereof. Examples of heat-recoverable materials may be found in U.S. Pat. No. 2,027,962 and British Patent No. 990,235.

Especially useful plastic materials include, for example, the olefin polymers of which are preferred high density polyethylene, polybutene-1, poly-4-methyl pentene and fluorinated polyolefins for example, ethylene-trifluorochloro ethylene copolymers and vinylidene fluoride polymers, especially pvf$_2$ and blends thereof of which there are preferred the fluorinated olefin blends as described and claimed in British Patent No. 1,120,131, and polyesters, for example, polyethylene terephthalate, polytetramethylene terephathalate for example that treated as described and claimed in dt-OS 2,448,414 or British Patent Specification No. 1,486,207, polyamides, polyphenylenesoxide and -sulphide, blends of polyethylene oxide with styrene silicon-carbonate block copolymers, polyaryl sulphones, polyether sulphones, polycarbonates especially those derived from bisphenyl-A polyamides, especially those described and claimed in British Patent No. 1,287,932 epoxy resins and blends of one or more of the above-mentioned polymeric materials either with each or with other polymeric materials.

To these materials there may be added any of the conventional additives, for examples, antioxidants, flame retardants, reinforcing fillers, cross-linking agents, pigments, fungicides and the like. As reinforcing fillers there may be especially mentioned glass fibers.

Of the metals capable of being rendered heat-recoverable there may be mentioned, as described in Great Britain Patent No. 2,090,076A, "Memory metals" sometimes also called "Memory Alloys" which are metallic materials that exhibit changes in strength and configurational characteristics on passing through a transition temperature, in most cases the transition temperature between the martensitic and austenitic states, and can be used to make heat-recoverable articles by deforming an article made from them whilst the metal is in its martensitic, low temperature state. The article will retain its deformed configuration until it is warmed above the transition temperature to the austenitic state when it will return or attempt to return towards its original configuration. It will be understood that the heat-recoverable article is capable of returning towards its original configuration without the further application of outside force. The deformation used to place the material in the heat unstable configuration is commonly referred to as thermally recoverable plastic deformation and can also, in certain cases, be imparted by introducing strains into the article above the transition temperature, whereupon the article assumes the deformed configuration on cooling through the transition temperature. It should be understood that the transition temperature may be a temperature range and that, as hysteresis usually occurs, the precise temperature at which transition occurs may depend on whether the temperature is rising or falling. Furthermore, the transition temperature is a function of other parameters, including the stress applied to the material, the temperatures rising with increasing stress.

Amongst such memory metals there may especially be mentioned various alloys of titanium and nickel which are described, for example, in U.S. Pat. Nos. 3,174,851; 3,351,463; 3,753,700; 3,759,552, British Patent Nos. 1,327,441 and 1,327,442 and NASA Publication SP 110, "55-Nitinol-The Alloy with a Memory, etc." (U.S. Government Printing Office, Washington, D.C. 1972). The property of heat recoverability has not, however, been solely confined to such titanium-nickel alloys. Thus, for example, various beta-brass alloys have been demonstrated to exhibit this property in, e.g. N. Nakanishi et al, Scripta Metallurgica 5 433-440 (Pergamon Press 1971), U.S. Pat. Nos. 3,783,037; 4,019,925, 4,144,104, 4,146,392 and 4,166,739, and such materials may be doped to lower their transition temperature to cryogenic regimes by known techniques. Similarly, 304 stainless steels have been shown to enjoy such characteristics E. Enami et al, id, at pp. 663-68.

In general these memory metals have a transition temperature within the range of from −196° C. to +135° C., especially from −196° C. to −70° C. (this being the lowest temperature they are liable to encounter during everyday use), and thus may be brought into their martensitic state by immersion into liquid nitrogen. However, more recently, it has been found possible to "precondition" memory metals so as transiently to raise their transition temperature. This enables the articles made from such alloys to be kept at room temperature prior to use, when they can be recovered by heating. Such preconditioning methods, which eliminate the need for liquid nitrogen during storage and transportation, are described, for example, in U.S. Pat. Nos. 4,036,669; 4,067,752 and 4,095,999. A further method of treating such alloys in order to raise their effective transition temperature is described and claimed in U.S. Pat. No. 4,149,911.

Further memory metals are described in U.S. Pat. No. 4,035,007 incorporated by reference herein.

Of course it must be understood that the use of an elongated heat-recoverable member means within the channels 18 shown in FIG. 1 requires that the means 14 not stretch or expand longitudinally as it expands laterally to fill the cross section of channel opening 22. As noted in U.S. Pat. No. 3,758,916 and incorporated by reference herein, it has been discovered that all of the dimensions of a heat recoverable article can be controlled, e.g., by fabricating the article of material into which have been incorporated a compressible fluid such as air, nitrogen, carbon dioxide, etc. Several methods of controlled introduction of such compressible fluids into heat recoverable materials have been discovered. One such method includes the use of a foamed thermoplastic material followed by crosslinking and then distortion. Subsequent reheating will allow the foam to attempt to recover to its initial dimensions. Another method which has been found to be successful is the use of a solid heat recoverable materials into which has been drilled or molded holes or air spaces which will act as compressible portions of the formerly solid material. By thus providing the heat recoverable material with a plurality of voids, members can be made which can be distorted so as to have a changed wall thickness and changed transverse dimensions without substantially changing the longitudinal dimension of the member.

For purposes of clarity and convenience, the term "intersticed" will be used herein to denote, and is intended to include, both materials that are foamlike in nature and materials which are solid but have a plurality of holes drilled, molded or otherwise fashioned therein. Similarly, the term "interstice" is used herein to denote and include both the holes formed by foaming a materials and those formed by drilling, molding and the like. Also, the term "longitudinal dimension" will be used herein to denote the dimension of a heat recoverable article which is to be maintained constant during distortion and recovery while the term "lateral dimension" will be used to denote the dimension of distortion and recovery.

Referring again to FIG. 2, it can be seen that the material means 14 in a preferred embodiment initially contact a portion of the channel surface 20 when located within a portion of a channel 18.

For the sake of visual clarity it should be noted that the spacing between mold section 12A, mold section 12B and filament matrix means 24 (in a preferred embodiment comprising fiberglass cloth and/or woven laminate as is well known to the art), is shown greatly exaggerated from the tightly packed spacing existing in the mold 12 during fabrication of an article. Mold sections 12A and 12B may be spaced in an embodiment of the invention so as to accept the filament matrix means adjacent the mold surface with the material means 14 located beneath the filament matrix means.

In a preferred embodiment of the present invention the molding apparatus will include at least one hardenable liquid injection port 26, wherein hardenable liquid such as thermosetting resin is injected into the mold, and wherein the material means will extend in at least one channel 18 radially outward from the hardenable liquid injection port. The preferential flow of hardenable liquid away from the port 26 is shown by arrow A 28.

The thermosetting resin may be selected from the group consisting of polyester resins, phenolic resins, vinyl ester resins, epoxy resins, polyurethane resins, polyisocyanurate resins, urethane resins, polyamide resins and polyacrylimate resins, or other hardenable liquids suitable for manufacture of articles.

When the hardenable liquid comprises a thermoset resin the recovery temperature of the heat recoverable material means is selected less than the temperature of gelation of the hardenable liquid, so that the material means starts to expand and fills the channel prior to sufficient increase of the viscosity of the hardenable liquid within the channel. Gelation is defined by the point at which the resin, after being catalyzed, ceases to be a viscous liquid and becomes a soft, elastic, rubbery solid. In layup or press molding, flow ceases after gelation, and no further changes may be made in any aspect of molding the product.

Referring now to FIGS. 4 and 5, in an alternative embodiment the heat recoverable material means 14A can be seen to have a first portion 30 and a second portion 32, the first portion comprising a heat recoverable plastics or metallic material and being locatable adjacent the mold surface 16. In a preferred embodiment the material of the first portion comprises polyethylene with a plurality of 0.05 inch holes drilled downwardly therein. The second portion in a preferred embodiment comprises a heat recoverable thermoplastic foam material. The upper surface 34 of the second portion may be operatively engaged such as with adhesive with the first portion, or the second portion may be laid beneath the first portion. As can be seen, a portion of the lower surface 36 of a second portion contacts the surface 20 of the channel 18. As before, the first portion and second portion are expandable within the channel opening 22 when heated so as to form substantially flat surface common with the mold surface 16.

In an alternative embodiment the first portion may be selected from a metallic heat recoverable material having greater dimensional predictability when expanded, such as the beta-brass alloy mentioned earlier. The function of the second portion 32 is to effectively fill the channel upon expansion, so as to force any hardenable liquid from the channel prior to the hardening of the liquid. Choice of a metallic first portion 30 improves the resultant surface finish of the article adjacent the entire heat recoverable material means 14A after the article is removed from the mold.

A laminate structure of two heat recoverable materials may therefore be used to maximize the removable of liquid from the channel and at the same time, ensure the occurrence of an acceptable surface finish on the article of manufacture adjacent the heat recoverable material means 14A.

FIG. 5 shows the heat recoverable material means 14A after being heated and having expanded within the channel 18.

Referring now to FIGS. 6 and 7 in an alternative embodiment the heat recoverable material means may take the form of a cylindrical shape, preferably having a first portion 38 and second portion 32A of materials mentioned earlier and shaped to fit within the circular channel opening 22A of mold surface 16. By sequentially placing a series of these circular channel openings 22A away from the hardenable liquid injection port 26A a channel 18A will be formed having a preferential direction of flow of the hardenable liquid shown by arrow B 28A, when the heat recoverable material means 14B is initially located within the opening 22A in its compressed configuration. It is easier to machine the circular channel openings 22A within the mold surface than it would be to cut an entire elongated channel in the mold 12 as shown in FIG. 1. A heat recoverable material means 14B is shown in FIG. 7 in its expanded state.

In operation the heat recoverable member means previously having been formed under heat and/or pressure from an expanded first configuration to a compressed second configuration is located within a portion of the channel. Hardenable liquid is then flowed within the mold. The heat recoverable member means are heated at least to a suitable temperature of recovery, depending upon the particular material used or materials used to form the heat recoverable material means. The member means thereafter expands to its first configuration within the channel. The hardenable liquid is then retained in the mold for a sufficient period for the liquid to harden sufficiently to dimensionally stabilize the article of manufacture, and the article of manufacture is thereafter removed from the mold.

In a preferred embodiment, the shape of the expanded first configuration of the heat recoverable material means is selected in the shape of the channel opening, such that a surface planar to the mold surface is defined by the heat recoverable material means when it is expanded by application of heat thereto.

In a preferred embodiment, the heat recoverable member means is heated at least to the temperature of recovery by thermal energy supplied to heat the mold. In an alternative embodiment, the heat recoverable member means may be heated solely by the thermal energy supplied by the hardenable liquid, which may be preheated before being flowed within the mold.

If the article of manufacture incorporates any filament matrix means, such as fiberglass cloth or roving well known to the art, such matrix means may be located within the mold after the heat recoverable member means are placed within the channel.

Many other variations and modifications may be made in the apparatus and techniques herein before described, by those having experience in this technology, without departing from the concept of the present invention. Accordingly, it should be clearly understood that the apparatus and method depicted in the accompanying drawings and referred to in the foregoing description are illustrative only and are not intended as limitations on the scope of the invention.

I claim as my invention:

1. A molding apparatus for reducing the fabrication time of a molded article of manufacture, wherein a portion of said article is formed by a hardenable liquid, said molding apparatus comprising:

a mold having a surface, said mold surface having at least one channel with an associated channel surface and channel opening defined relative to said mold surface, said channel allowing accelerated flow of said hardenable liquid throughout said mold, and heat recoverable material means previously having been deformed from a first configuration to a compressed second configuration, said material means when subjected to a suitable temperature of recovery capable of recovery to or towards said first configuration, said heat recoverable material means in said compressed second configuration being located within a portion of said channel.

2. The apparatus of claim 1 wherein said molding appartus further includes at least one hardenable liquid injection port.

3. The apparatus of claim 2 wherein at least one heat-recoverable material means extends in at least one channel outward from said hardenable liquid injection port.

4. The apparatus of claim 1 wherein at least a portion of said heat-recoverable material means is a heat-recoverable cross-linked material having interstices defined therein.

5. The apparatus of claim 1 wherein at least a portion of said heat-recoverable material means is a heat-recoverable polymeric or metallic material.

6. The apparatus of claim 1 wherein said heat-recoverable material means has a first portion and a second portion, said first portion comprising a heat-recoverable polymeric or metallic material, said first portion locatable adjacent said mold surface, and wherein said second portion comprises a heat-recoverable material, the upper surface of said second portion operatively engaged with said first portion, a portion of the lower surface of said second portion contacting the surface of said channel, said first portion and said second portion expandable within said channel opening when heated so as to form a substantially flat surface common with said mold surface.

7. The apparatus of claim 1 wherein said molding apparatus further includes at least one hardenable liquid injection port, and wherein said channel extends in a continuous manner radially outward away from said hardenable liquid injection port, said heat-recoverable material means having an elongate shape so as to be placed within said channel, said heat-recoverable material means having interstices defined therein.

8. The apparatus of claim 1 wherein said channel comprises at least one circular opening formed downward within said mold surface, said heat-recoverable material means having a cylindrical shape when expanded so as to fill said circular opening.

9. The apparatus of claim 1 wherein said heat-recoverable material further includes fibers.

* * * * *